US011319493B2

(12) United States Patent
Daggupati et al.

(10) Patent No.: US 11,319,493 B2
(45) Date of Patent: May 3, 2022

(54) METHOD FOR CATALYTIC CONVERSION OF WASTE PLASTIC INTO LIQUID FUEL

(71) Applicant: Reliance Industries Limited, Mumbai (IN)

(72) Inventors: Sateesh Daggupati, Khamman (IN); Sayani Thakur, Kolkata (IN); Sachchit Majhi, Jamshedpur (IN); Sukumar Mandal, Faridabad (IN); Asit Kumar Das, Jamnagar (IN); Vishwanath Sapre Ajit, Tampa, FL (US)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 17/272,020

(22) PCT Filed: Aug. 28, 2019

(86) PCT No.: PCT/IB2019/057228
§ 371 (c)(1),
(2) Date: Feb. 26, 2021

(87) PCT Pub. No.: WO2020/044248
PCT Pub. Date: Mar. 5, 2020

(65) Prior Publication Data
US 2021/0348061 A1 Nov. 11, 2021

(30) Foreign Application Priority Data
Aug. 28, 2018 (IN) .............................. 201821032224

(51) Int. Cl.
*C10G 1/10* (2006.01)
*B01J 19/28* (2006.01)
(Continued)

(52) U.S. Cl.
CPC ............... *C10G 1/10* (2013.01); *B01D 45/16* (2013.01); *B01J 4/005* (2013.01); *B01J 19/006* (2013.01);
(Continued)

(58) Field of Classification Search
USPC ............ 585/240–242; 201/3, 2.5, 21, 29, 33
See application file for complete search history.

(56) References Cited

U.S. PATENT DOCUMENTS 5,216,149 A * 6/1993 Evans ...................... C10G 1/10
252/182.28
6,184,427 B1 2/2001 Klepfer et al.
(Continued)

FOREIGN PATENT DOCUMENTS

| JP | 3370859 B2 | 1/2003 |
| WO | 2014125345 A1 | 8/2014 |
| WO | 2017168163 A1 | 10/2017 |

OTHER PUBLICATIONS

International Search Report issued in International Application No. PCT/IB2019/057228 dated Dec. 12, 2019 (3 pages).
(Continued)

*Primary Examiner* — Nina Bhat
(74) *Attorney, Agent, or Firm* — Osha Bergman Watanabe & Burton LLP

(57) ABSTRACT

The present disclosure provides a method for catalytic conversion of waste plastic into liquid fuel. The method comprises thermally decomposing the waste plastic at a temperature in the range of 350 to 650° C. and under a pressure in the range of 0.0010 psi to 0.030 psi, to obtain a gaseous stream. The gaseous stream is further subjected to four stage sequential cooling to a temperature in the range of −5 to −15° C. to obtain a gas-liquid mixture comprising a gaseous fraction and a liquid fraction. The gas-liquid mixture is fed to the gas-liquid separator to obtain the gaseous
(Continued)

fraction comprising C1 to C4 hydrocarbons and the liquid fraction comprising liquid fuel. The method of the present disclosure is simple, economical and energy efficient, which provides a high value liquid fuel with enhanced yield.

19 Claims, 1 Drawing Sheet

(51) Int. Cl.
| | | |
|---|---|---|
| | *B01D 45/16* | (2006.01) |
| | *B01J 4/00* | (2006.01) |
| | *B01J 19/00* | (2006.01) |
| | *C10G 1/00* | (2006.01) |
| | *C10G 1/08* | (2006.01) |
| | *C10L 1/06* | (2006.01) |

(52) U.S. Cl.
CPC .............. *B01J 19/28* (2013.01); *C10G 1/002* (2013.01); *C10G 1/086* (2013.01); *C10L 1/06* (2013.01); *B01J 2219/00763* (2013.01); *C10G 2300/1003* (2013.01); *C10G 2300/202* (2013.01); *C10G 2300/4006* (2013.01); *C10G 2300/706* (2013.01); *C10G 2400/02* (2013.01); *C10L 2200/0423* (2013.01); *C10L 2200/0461* (2013.01); *C10L 2270/023* (2013.01); *C10L 2290/06* (2013.01); *C10L 2290/24* (2013.01); *C10L 2290/28* (2013.01); *C10L 2290/544* (2013.01)

(56) References Cited

U.S. PATENT DOCUMENTS

| | | | | |
|---|---|---|---|---|
| 7,893,307 | B2* | 2/2011 | Smith | C10B 47/44 366/85 |
| 8,137,508 | B2* | 3/2012 | Grispin | C10B 1/08 201/25 |
| 9,234,138 | B1* | 1/2016 | Li | C10B 57/06 |
| 10,093,864 | B2* | 10/2018 | Tandon | C10G 1/002 |
| 10,472,487 | B2* | 11/2019 | Gil | B01J 27/19 |
| 2004/0182001 | A1* | 9/2004 | Masemore | C10G 1/10 48/209 |
| 2008/0128259 | A1* | 6/2008 | Kostek | C10G 1/10 201/4 |

OTHER PUBLICATIONS

Written Opinion issued in International Application No. PCT/IB2019/057228 dated Dec. 12, 2019 (6 pages).

* cited by examiner

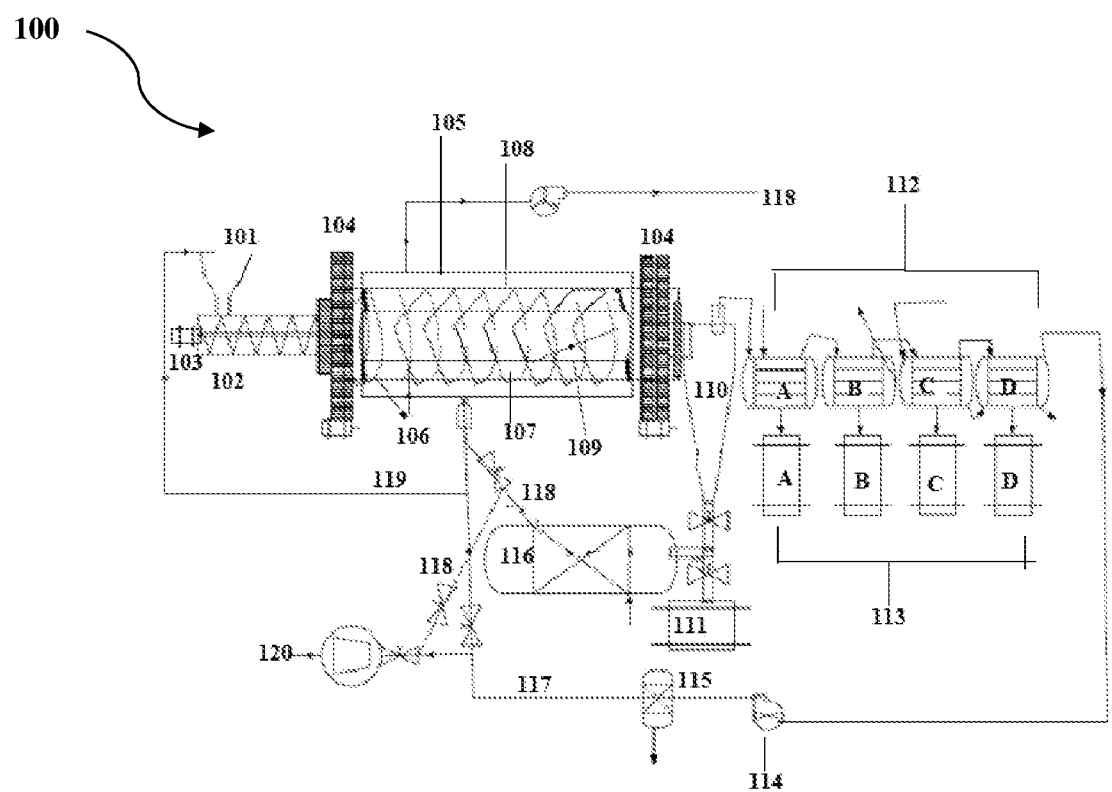

METHOD FOR CATALYTIC CONVERSION OF WASTE PLASTIC INTO LIQUID FUEL

FIELD

The present disclosure relates to a method for catalytic conversion of waste plastic into liquid fuel.

BACKGROUND

The background information herein below relates to the present disclosure but is not necessarily prior art.

The growing plastic production and usage has made plastic an indelible component of MSW (Municipal Solid Wastes), thus affecting the environment by causing air, water, and soil pollution. The strict present-day regulations on traditional waste management practices like incineration and landfilling have led to the finding a viable route for plastic disposal.

Plastic is a polymer of hundreds of linked hydrocarbon monomers which degrade into several smaller fragments under moderate to high temperature and pressure conditions, in the presence or absence of a suitable catalyst. These fragments undergo rearrangement and reform into valuable hydrocarbon fractions. The degradation of plastic into lighter fractions, gasoline, diesel residue and fractions consisting of valuable chemicals/hydrocarbons such as BTX, olefins, and other is considered as chemical recycling or pyrolysis.

There are several pyrolysis processes developed for the conversion of the waste plastic into fuel/olefins/BTX e.g. slow pyrolysis, fast pyrolysis, flash pyrolysis, thermal pyrolysis, catalytic pyrolysis, liquefaction and torrefaction. These processes may or may not utilize catalysts to meet the specific objectives of improving liquid/gas yield, reduces char formation and improves energy efficiency. However, the conventional processes of catalytic pyrolysis carried out in fixed or fluidized beds or CSTRs are associated with certain challenges such as quality of the liquid products, amount of char production, operational flexibility, agglomeration and stickiness of feed particles and overall cost. Conventionally, rotary kilns are used for thermal or catalytic pyrolysis of the waste plastics which are comparatively less costly in operation and maintenance, however there are several unresolved challenges related to these reactors units such as leakages from moving and stationary parts of the rotary kiln reactors, agglomeration, stickiness to the reactor walls, excess char formation on the inner surface of the reactors, de-fluidization in fluidized bed reactors, lump formation and obstructions to the flow etc. which leads to undesirable by-products and poor liquid yield.

Hence, there is felt a need for a continuous, viable method for converting plastics preferably the waste plastic into high quality liquid fuel that mitigates the above mentioned limitations.

OBJECTS

Some of the objects of the present disclosure, which at least one embodiment herein satisfies, are as follows.

An object of the present disclosure is to ameliorate one or more problems of the prior art or to at least provide a useful alternative.

Another object of the present disclosure is to provide a continuous method for catalytic conversion of the waste plastic to a high quality liquid fuel with enhanced yield.

Still another object of the present disclosure is to provide a low temperature method for catalytic conversion of the waste plastic to liquid fuel.

Yet another object of the present invention is to provide a continuous method for catalytic conversion of the waste plastic to a high quality liquid fuel, which avoids lump formation, stickiness of unreacted feed to the inner walls of the reactor, heavier tar formation, higher coke formation and allows the cracking of heavier hydrocarbons or tar in to high quality liquid product.

Other objects and advantages of the present disclosure will be more apparent from the following description, which is not intended to limit the scope of the present disclosure.

SUMMARY

The present disclosure provides a method for catalytic conversion of waste plastic into liquid fuel. The method comprises mixing the waste plastic feed and a catalyst in a feed hopper (101) to obtain a mixture. The mixture is fed to a rotary kiln reactor (108) via a screw feeder (102). The waste plastic from the mixture is thermally decomposed at a temperature in the range of 350 to 650° C. and under a pressure in the range of 0.0010 psi to 0.030 psi, to obtain a gaseous stream. The gaseous stream is purged from the rotary kiln rotator (108) by means of a carrier gas. The purged gaseous stream is fed to a cyclone separator (110) to separate solid particles from the gaseous stream. The solid particles comprising a residual catalyst and char particles are collected in a bio-char drum (111). The gaseous stream obtained from the cyclone separator (110) is further subjected to sequential cooling in a condensation unit (112) to a temperature in the range of −5 to −15° C. to obtain the liquid fuel. The non-condensable gases from the condensation unit (112) are further fed to gas-liquid separator (115) to obtain a product gas comprising $C_1$ to $C_4$ hydrocarbons (117) and the liquid fraction.

The present disclosure further provides a system (100) for conversion of a waste plastic into a liquid fuel. The system comprises a feed hopper (101) adapted to collect the waste plastic feed; a screw feeder (102) adapted to feed the waste plastic feed and a catalyst to a rotary kiln reactor (108); the rotary kiln reactor (108) adapted to thermally decompose the waste plastic; a furnace (105) positioned externally to the rotary kiln reactor (108) for combusting a recycled flue gas to attain pre-determined temperature in the annulus area (107) of the kiln reactor (108); a cylindrical pipe (109) positioned in the centre of the rotary kiln reactor (108) that is adapted to facilitate the thermal decomposition of the waste plastic in the annulus area (107) of the kiln reactor (108); wherein the cylindrical pipe (109) is closed at both the ends; helical baffles (106) attached to the inner wall of the rotary kiln reactor (108) from one end to other end and adapted to increase the residence time of catalyst and molten plastic; a induced draft fan (114) adapted to generate negative pressure in the rotary kiln reactor (108); a cyclone separator (110) adapted to separate a residual catalyst and char particles from the gaseous stream generated in the rotary kiln reactor (108); a four stage condensation unit (112) adapted to condense the gaseous stream to obtain liquid fuel; a liquid collection tank unit (113) adapted to collect the condensed liquid fuel from the condensation unit (112) and a gas liquid separator (115) adapted to separate the non-condensable gases from the liquid fraction.

BRIEF DESCRIPTION OF THE ACCOMPANYING DRAWING

The present disclosure will now be described with the help of the accompanying drawing, in which:

FIG. 1 illustrates a schematic representation of the method for the catalytic conversion of the waste plastic for producing a high quality liquid fuel.

LIST OF REFERENCE NUMERALS

| | |
|---|---|
| Feed Hopper | 101 |
| Screw feeder | 102 |
| Motor | 103 |
| Rotating Wheel attached to the reactor | 104 |
| furnace | 105 |
| Helical baffle | 106 |
| Annulus space of the reactor | 107 |
| Rotary kiln reactor | 108 |
| Cylindrical pipe | 109 |
| Cyclone separator | 110 |
| Bio-char drum | 111 |
| Four stage condensation unit | 112A-112D |
| Liquid collections tanks | 113A-113D |
| Induced draft fan | 114 |
| Gas-liquid separator | 115 |
| Catalyst regeneration unit | 116 |
| Product gas | 117 |
| Flue gas | 118 |
| Regenerated catalyst | 119 |
| Power generator-turbine system | 120 |

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

The consumption of plastic has increased exponentially over the last few years. Strict regulations on plastic waste management have led to the development of different routes for plastic disposal. Conventionally, several pyrolysis processes exist for the conversion of the waste plastic into fuel/olefins/BTX. However, these conventional processes are associated with significant challenges such as quality of the liquid products, amount of char production and lump formation in the reactor.

Therefore, the present disclosure provides a method for catalytic conversion of the waste plastic into liquid fuel. The method is disclosed in detail herein below.

Initially, the waste plastic feed and a catalyst are mixed together in a feed hopper (101) to obtain a mixture. The mixture is fed to a rotary kiln rotator (108) via a screw feeder (102). The waste plastic from the mixture is thermally decomposed at a temperature in the range of 350 to 650° C. and under a pressure in the range of 0.0010 psi to 0.030 psi to obtain a gaseous stream. Typically, the waste plastic from the mixture is thermally decomposed at a temperature in the range of 350 to 450° C.

Optionally, the waste plastic is shredded and/or grinded to obtain the plastic particulates of the pre-determined size. Typically, the pre-determined size of the particulates is in the range of 1 to 10 cm. The particulates of pre-determined size are mixed with catalyst to form a mixture, which is subjected to thermal decomposition at a temperature in the range of 350 to 650° C., preferably 350 to 450° C.

The gaseous stream is then purged from the rotary kiln rotator (108) by means of a carrier gas selected from nitrogen, argon and recycled product gas (117). The purged gaseous stream is introduced in a cyclone separator (110) to separate the solid particles from the gaseous stream. The solid particles are collected at the bottom of the separator in a bio-char drum (111). Typically, the solid particles comprise a residual catalyst and char particles.

The gaseous stream that is devoid of solid particles obtained from the cyclone separator (110) is further subjected to sequential cooling in a condensation unit (112) to a temperature in the range of −5 to −15° C. to obtain liquid fuel.

Typically, the step of sequential cooling the gaseous streams involves four stage cooling of the gaseous stream using a chilling liquid selected from water and ethylene glycol.

In the first stage (112A) the gaseous stream is cooled to 30° C. with the help of water to obtain first liquid fraction comprising >$C_{20}$ hydrocarbons which is collected at first liquid collection tank (113A). In the second stage (112B) the gaseous stream is cooled to 10° C. with the help of water to obtain second liquid fraction comprising $C_{13}$-$C_{20}$ hydrocarbons, which is collected at second liquid collection tank (113B). In the third stage (112C) the gaseous stream is cooled to 0° C. with the help of ethylene glycol to obtain third liquid fraction comprising $C_7$-$C_{12}$ hydrocarbons, which is collected at third liquid collection tank (113C). In the fourth stage (112D) the gaseous stream is cooled to −10° C. with the help of ethylene glycol to obtain fourth liquid fraction comprising $C_5$-$C_6$ hydrocarbons which is collected at fourth liquid collection tank (113D).

The non-condensable gases from the condensation unit (112) are sent to the gas-liquid separator (115) to obtain the product gas (117) comprising $C_1$-$C_4$ hydrocarbons and the liquid fraction.

The waste plastic is selected from the group consisting of high density and low density polyethylene, linear low density polyethylene, polypropylene, poly styrene, PET, EPDM and combination thereof.

The catalyst is selected from the group consisting of spent FCC catalyst, Y-zeolite and ZSM-5 zeolite. In accordance with the present disclosure, low acidity catalyst is used for conversion of the waste plastic, which suppresses excess cracking and also minimize the formation of dry gas.

The weight ratio of the feed to the catalyst is in the range of 1:0.1 to 1:3, preferably 1:0.15 to 1:1.5.

In accordance with one embodiment of the present disclosure, the product gas (117) obtained from the gas-liquid separator (115) comprising $C_1$-$C_4$ hydrocarbons is sent to the power generation-turbine system. The product gas is combusted to generate power.

In accordance with another embodiment of the present disclosure, the product gas (117) obtained from gas-liquid separator (115) comprising $C_1$ to $C_4$ hydrocarbons is used as a carrier gas to purge the gaseous stream from the rotary kiln reactor (108).

In accordance with still another embodiment of the present disclosure, the product gas (117) is used to regenerate residual catalyst in a catalyst regeneration unit (116).

The present disclosure further provides a system for the catalytic conversion of the waste plastic into liquid fuel.

The waste plastic, of which the non-limiting examples include high density and low density polyethylene, polypropylene, EPDM and the like and any of their combinations is collected in feed hopper (101). Optionally, the waste plastic is shredded and/or grinded to obtain particulates of size in the range of 1 to 10 cm.

The waste plastic is mixed with a low acidic catalyst selected from spent FCC catalyst, Y-zeolite and ZSM-5 to obtain a mixture. The mixture is sent to a rotary kiln reactor (108) via a screw feeder (102).

In the rotary kiln reactor (108), the particulates from the mixture are thermally decomposed to obtain a gaseous stream.

In accordance with the embodiments of the present disclosure, the feeding system (101 and 102) is a stationary part whereas the kiln reactor (108) is rotating with a speed in the range of 0.5 to 10 rpm. Further, the angle of the rotary kiln reactor is varied with an inclination of 1° C. to 10° C.

The stationary part and moving part are connected through inert blanketing or double lock sealing system wherein introduction of air into the kiln reactor is arrested by continuous inert (typically $N_2$) gas purging.

The rotary kiln reactor (108) is heated externally by means of furnace (105) to maintain the temperature inside the kiln reactor from 350° C. to 650° C., preferably 350° C. to 450° C. 1. Typically, the angle of inclination of the rotary kiln reactor (108) is in the range of 1 to 10 deg, and the rotating speed is in the range of 0.2 to 20 rpm.

The gaseous stream formed in the kiln reactor (108) is passed through a cyclone separator (110) to separate the solid particles comprising a residual catalyst and char particles.

The residual catalyst and char particles collected at the bottom of the cyclone separator in a bio-char drum (111) and are further subjected to a separate lock hoper char discharge system (not shown in FIGURE). The char particles are sent to a boiler for the regeneration of the catalyst, where the char is burnt with air to generate heat. Further, the flue gases (118) generated during combustion of char either used to generate the power in a power generation-turbine system (120) or it can be routed for heating the reactor.

The gaseous stream from the cyclone separator (110) is subjected to four stage condensation system (112) comprising four stage cooling system (112A-112D).

In the first stage (112A) the gaseous stream is cooled to 30° C. with the help of water to obtain first liquid fraction comprising >$C_{20}$ hydrocarbons which is collected at first liquid collection tank (113A). In the second stage (112B) the gaseous stream is cooled to 10° C. with the help of water to obtain second liquid fraction comprising $C_{13}$-$C_{20}$ hydrocarbons, which is collected at second liquid collection tank (113B). In the third stage (112C) the gaseous stream is cooled to 0° C. with the help of ethylene glycol to obtain third liquid fraction comprising $C_7$-$C_{12}$ hydrocarbons, which is collected at third liquid collection tank (113C). In the fourth stage (112D) the gaseous stream is cooled to −10° C. with the help of ethylene glycol to obtain fourth liquid fraction comprising $C_5$-$C_6$ hydrocarbons which is collected at fourth liquid collection tank (113D).

The product gas (117) comprising non-condensable gases ($C_1$ to $C_4$) coming out from the condensation unit (112) is separated from the liquid fraction in the gas-liquid separator (115).

The separated product gas (117) is sent to at least one unit selected from the power generation-turbine system (120) to generate power, the rotary kiln reactor (108) to purge gaseous stream and the catalyst regeneration unit (116) to regenerate the residual catalyst.

In accordance with the present disclosure, the kiln reactor is operated under negative pressure. An induced draft fan (114) is incorporated to maintain the reactor pressure in the range of 0.0010 to 0.030 psi at the downstream section of the unit i.e. after the gaseous fraction cooling section.

In accordance with the present disclosure, a cylindrical pipe (109) is fixed within the kiln reactor (108) to minimize the vapour residence time. This arrangement further helps in minimizing the excess thermal cracking of the product hydrocarbon vapours into undesired products within in the reactor. It also helps to maximize liquid yield and minimize the gas and char products within the reactor. The gaseous stream and solid material (feed/catalyst/char etc.) will flow through the annular space between the kiln reactor (108) and dummy cylindrical pipe (109).

Further, helical baffles (106) are attached to the inner wall of the rotary kiln reactor (108) from one end to other end. Internal helical baffles (106) help to increase the residence time of the molten plastic and the catalyst which further improves the conversion.

The system further comprises a catalyst regeneration unit (116) adapted to regenerate catalyst and a power generation turbine system (120) adapted to generate power.

The present disclosure provides a low energy catalytic method for converting the waste plastics into high quality liquid fuel with high yield. The method of the present disclosure does not require external energy source for the processing. The non-condensed gas generated during the process can be used to provide energy, which makes the method self-sufficient and economical.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Example 1: Sample Preparation

Waste plastic (commercially available mixed waste plastic) sample was taken whose particle size is varying between 0.5 cm to 5 cm. The elemental analysis of the feed sample is given below in Table 1.

TABLE 1

Elemental analysis of typical mixed waste plastics

| Sample | Color | N % | C % | H % | S % | C/H | Predicted Polymer |
|---|---|---|---|---|---|---|---|
| Plastic | Green | 1.49 | 50.13 | 3.45 | 0.34 | 14.53 | PET |
| Plastic | Light Green | 1.91 | 73.97 | 6.88 | 0.08 | 10.75 | ABS |
| Plastic | Blue | 0.48 | 60.12 | 9.47 | 0.07 | 6.53 | PP/PE |
| Plastic | Orange | 0.43 | 74.80 | 5.42 | 0.06 | 13.80 | PS |
| Plastic | Grey | 1.58 | 75.35 | 5.93 | 0.05 | 12.71 | PS |
| Mixed Waste/Electrical Waste | | | Inorganic content/Ash content = 3-5% | | | | |

Example 2-5

Catalytic Conversion of the Waste Plastic into a High Quality Liquid Fuel in Accordance with the Present Disclosure General Procedure:

A set of experiments were conducted on a laboratory-scale reactor to confirm the catalyst activity of the proposed catalyst i.e. refinery spent FCC catalyst (E-Cat) in accordance with the present disclosure.

Experiments on catalytic conversion of the waste plastic were conducted in a lab-scale fixed bed reactor set-up which consists of a vertical tubular reactor (1-inch ID and 10-inch length), which was heated by electric furnace. Initially the reactor was charged with a given quantity of the waste plastic feed from Example 1 and an FCC spent catalyst. The ratio of the catalyst to the waste plastic feed was in the range of 0.1 to 5. The furnace was heated up to 750° C. The reactor was then suddenly immersed into the furnace to attain a higher heating rate of a minimum 100° C./min for the thermal decomposition of the waste plastic.

Reaction conditions include a specific predetermined temperature, typically in the range of 350 to 650° C., atmospheric pressure, and vapor residence time of few seconds. Flow rate of nitrogen was 60 ml/min to purge the gaseous stream from the reactor continuously. The temperature of the coolant liquid tank was adjusted in between −10 to −15° C. by a chilling liquid (ethylene glycol) so that vapors get condensed inside the gas-liquid separator and the organic liquid was collected in the vail, at the bottom of the gas liquid separator. Non-condensable gases were further passed to a syphon system (water displacement method) where the displaced water was collected in another tank.

After completion of experiment run (20 mins.), the total gas was collected and analyzed by gas chromatography. The yield of liquid product was calculated by the total weight difference of gas liquid separator before and after the reaction.

After completion of the experiment, char conversion was obtained by measuring the solid residue by using C—S (carbon-sulfur) analyzer. The quality of the liquid was analyzed by the SIMDIST analyzer.

Experimental Conditions:

Example 2 was carried out using the same experimental procedure described herein above at 400° C. in the presence of spent FCC catalyst.

Example 3 was carried out using the same experimental procedure described herein above at 500° C. in the presence of spent FCC catalyst.

Comparative Example 4 was carried out using the same experimental procedure described herein above at 400° C., except in the absence of catalyst.

Comparative Example 5 was carried out using the same experimental procedure described herein above at 500° C., except in the absence of catalyst.

The results for examples 2-5 are tabulated below in Table 2.

TABLE 2

Effect of Catalyst on the conversion of the waste plastic

| | Example No. | | | |
|---|---|---|---|---|
| | 2 | 4 | 3 | 5 |
| Temperature ° C. | 400 | | 500 | |
| Catalyst | Spent FCC catalyst | No Catalyst | Spent FCC catalyst | No Catalyst |
| Gas, wt. % | 2.9 | 2.7 | 3.6 | 3.1 |
| Char, wt. % | 14.6 | 20.6 | 10.3 | 12.1 |
| Liquid Quality | | | | |
| Gasoline, wt. % | 34.2 | 23.3 | 49.2 | 41.2 |
| LCO, wt. % | 31.5 | 31.6 | 26.3 | 28.8 |
| CSO, wt. % | 16.8 | 21.8 | 10.6 | 14.7 |

From table 2, it is evident that the catalytic conversion of the waste plastic in the presence of the catalyst exhibited enhanced yields of liquid fuel and reduced formation of char as compared to thermal conversion in the absence of catalyst. The spent FCC catalyst used in the process is characterized by small pore size, surface area and lower activity of the weak and strong acid sites due to the deposition of metals and coke on the its surface. The lower activity helped to reduce higher secondary catalytic cracking of the liquid hydro carbon vapours. Moreover, the liquid product obtained by catalytic conversion of the waste plastic has higher concentration of gasoline.

Examples 6-10

Effect of the Temperature of Reactor on the Waste Plastic Conversion

Examples 6-10 were carried out using same experimental procedure described herein above by varying the temperature in the range of 350 to 550° C.

The results for examples 6-10 are tabulated below in Table 3.

TABLE 3

Effect of Temperature on the catalytic conversion of the waste plastic
Catalytic ratio (Cat/Feed = 0.2)

| | Example No. | | | | |
|---|---|---|---|---|---|
| | 6 | 7 | 8 | 9 | 10 |
| Temperature, ° C. | 550 | 500 | 450 | 400 | 350 |
| Product Yields | | | | | |
| Liquid, wt. % | 25.6 | 9.9 | 4.4 | 3.8 | 3.5 |
| Gas, wt. % | 7.2 | 9 | 10.6 | 11.3 | 13.3 |
| Char, wt. % | 0 | 0 | 0 | 2.5 | 6.6 |
| Liquid Quality | | | | | |
| Gasoline, wt. % | 48.5 | 54.8 | 45.6 | 34.1 | 25.6 |
| LCO, wt. % | 13.1 | 17.9 | 25.3 | 31.5 | 32.4 |
| CSO, wt. % | 5.6 | 7.4 | 14.0 | 16.8 | 18.6 |

From Table 3, it is evident the waste plastic conversion increased with increase in temperature and formation of unconverted decreased with increase in temperature. The difference in the yields is a reflection of the temperature, in which these feeds are pyrolyzed. The conversion at lower temperature can be increased by increasing the catalyst to feed ratio which will further yield higher gas, due to excess catalytic cracking of the vapors. The gas yields increased at higher temperature due to secondary thermal and catalytic cracking of the hydrocarbon vapors at higher temperature. It may be also noted that the gasoline content of the liquid product increases with increasing temperature due to excess thermal cracking of the heavier fractions in the liquid product.

Examples 11-16

Effect of Catalyst to Feed Ratio on the Waste Plastic Conversion

Examples 11-16 were carried out using same experimental procedure described herein above by varying catalyst to feed ratio in the range of 0 to 4.

The results for examples 11-16 are tabulated below in Table 4.

TABLE 4

Effect of the catalyst loading on the catalytic conversion of the waste plastic

| | Example No. | | | | | |
|---|---|---|---|---|---|---|
| | 11 | 12 | 13 | 14 | 15 | 16 |
| Reaction Temperature 450° C. | | | | | | |
| Catalyst to Feed Ratio | 4 | 3 | 2 | 1 | 0.2 | 0 |
| Product Yields | | | | | | |
| Gas, wt. % | 57.1 | 48.4 | 36.5 | 21.4 | 4.1 | 3.3 |
| Char, wt. % | 6.1 | 6.8 | 7.4 | 10.6 | 11.8 | 18.6 |
| Liquid Quality | | | | | | |
| Gasoline, wt. % | 30.2 | 33.1 | 34.9 | 39.9 | 45.2 | 28.5 |
| LCO, wt. % | 4.7 | 8.0 | 13.7 | 18.2 | 25.1 | 26.7 |
| CSO, wt. % | 1.8 | 3.5 | 7.5 | 9.9 | 13.9 | 23.0 |

From table 4, it can be seen that an optimum catalyst to feed ratio is in the range of 0.2-1.0 for obtaining maximum liquid yield. The gas yield increases with the catalyst to feed ratio due to accelerated over cracking of >C5 hydrocarbon fractions in presence of the excess catalyst.

Examples 17-21

Re-Usability of the Catalyst

The re-usability of the catalyst was verified by conducting the experiments in the fixed bed reactor under constant temperature of 450 □ and at constant catalyst to feed ratio=0.2 with mixed waste plastics shown in Table 5.

After completion of the experiments, the catalyst recovered was regenerated and further it was used for the next experiment with fresh feed at similar operating conditions. This process was repeated several times, to check the product yield quality on the basis of catalyst activity loss. It can be seen that; the catalyst didn't lose much of the active sites required for the conversion of the waste plastics.

TABLE 5

Effect of Re-usability of catalyst
Re-usability of the catalyst
Coke is physically mixed and deposited on the catalyst surface

| | Example no. | | | | |
|---|---|---|---|---|---|
| | 17 | 18 | 19 | 20 | 21 |
| Products | 1st usage | 2nd usage | 3rd usage | 4th usage | 5th usage |
| Gas wt % | 4.8 | 5.0 | 4.7 | 4.9 | 5.1 |
| liquid wt % | 84.2 | 83.9 | 84.1 | 84.3 | 84 |
| Char wt % | 11 | 11.1 | 11.2 | 10.8 | 10.9 |

Examples 22-33

Effect of Angle of Inclination, Speed of Reactor Rotation of the Kiln and Cylindrical Pipe and Helical Baffles Addition on Residence Time Initially, RTD (tracer studies) were conducted with waste ABS feed pellets and catalyst to optimize the angle of inclination (degree) as well as the speed of rotation of kiln reactor.

Table 6 shows the variation of solid residence time with the angle of inclination at a constant speed of rotation for given feed (waste ABS feed pellets) and catalyst (catalyst/feed=0.2) to optimize the angle of inclination (degree) at a constant reactor rotation of 1.5 rpm.

TABLE 6

Effect of angle of inclination of the kiln on residence time

| Example no. | Angle of inclination (degree) | Solid residence time (mins) |
|---|---|---|
| 22 | 0.5 | 66 |
| 23 | 1.2 | 44 |
| 24 | 1.8 | 32 |
| 25 | 2.2 | 21 |
| 26 | 3.0 | 13 |
| 27 | 4 | 5 |

TABLE 7

Effect reactor rotation (rpm) on residence time

| Example no. | reactor rotation (rpm) | Solid residence time (mins) |
|---|---|---|
| 28 | 0.5 | 78 |
| 29 | 1.5 | 46 |
| 30 | 2 | 35 |
| 31 | 3 | 21 |
| 32 | 4 | 7 |

From table 6 and 7, it is evident that the optimized conditions for angle of inclination and rotation of the reactor chosen for the pilot experimentation was 1.2 degree and 1.5 rpm respectively.

The effect of addition of cylindrical pipe embodiment closed from both ends welded to the reactor for reducing the vapor residence time and the addition of helical baffles on the inner wall of the kiln from end to end for increasing the molten polymers residence time was also studied. The Table 8 elaborates the effect of cylindrical pipe and helical baffles addition.

TABLE 8

Effect of cylindrical pipe and helical baffles addition.

| | Reactor modification: | | | |
|---|---|---|---|---|
| | As such reactor | only cylindrical pipe | only helical baffle | cylinder & baffle |
| | Example no | | | |
| | 33 | 34 | 35 | 36 |
| Feed | Toys and household items (ABS) | | | |
| C/F | 0.2 | | | |
| Temp ° C. | 425 | | | |
| Reactor rotation rpm | 1.5 | | | |
| Angle of inclination o | 1.2 | | | |
| Gasoline (IBP - 210) | 19.6 | 29.4 | 30.2 | 43.4 |
| LCO (215-360) | 18.4 | 26.9 | 24.1 | 27.9 |
| CSO (360+) | 10.1 | 13.5 | 10.4 | 10.8 |
| Gas, % | 31.6 | 11.40 | 25.20 | 8.46 |
| Char, % | 20.3 | 18.80 | 10.10 | 9.44 |

It is observed from the experiment (33-36) that the effect of residence time on the conversion of the waste plastics in a rotary kiln is that there is a formation of higher gas and significant agglomerated lumps and sticky material of unreacted feed mixed with char. The excess secondary cracking was minimized by reducing the free area of the reactor with a help of cylindrical embodiment (20 cm dia. & 230 cm length) closed from both ends attached to the inlet and outlet of the kiln reactor which henceforth revolved along with the kiln. The solid closed cylinder increased the velocity of the vapors to purge out of the kiln thereby reducing its residence time by nearly half to the original value (i.e as such reactor case).

The addition of helical baffles in the inner walls of the kiln helped in axial mixing of the catalyst with molten polymers which increased the solid residence time thuds improves the conversion of the feedstock. The combination of both lower residence time and higher solid residence time with optimum catalyst to feed ratio, temperature, reactor rotation and angle of inclination yielded high liquid with maximum gasoline fraction.

Examples 37-41

Effect of Catalytic Conversion of Different Waste Plastics Feedstock at Optimized Conditions Described Herein Above at a Federate of 10 kg/hr is Shown The effect of conversion on different waste feedstock with spent FCC catalyst at a ratio of C/F=0.2, at desired reaction temperature, reaction in the annulus chamber in presence of baffles attached to the inner walls of the reactor a set of experiments were carried out. The feed rate was kept at a constant rate 10 kg/hr for 3 hrs is shown. Five different types of waste plastic feed stocks were waste acrylonitrile butadiene styrene (ABS) toys and house hold items pellets, waste pipe and household items high density poly ethylene (HDPE) pellets, waste linear low density poly ethylene (PE) film category carry bags and milk pouches mixture, waste poly propylene (PP) straws, and poly styrene (PS) electric & electronic waste plastic, samples are used to study the catalytic conversion at desired temperatures.

The angle of inclination was maintained at 1.2 deg. and kiln reactor is rotated with 1.5 rpm during the experimentation. Reactor inner temperature is maintained steadily at the desired reaction temperature. The reactor pressure is measured by water manometer and maintained at constantly −2 mm water column during the entire experimental runs.

The feed rate was kept at a constant rate 10 kg/hr for 3 hrs and the spent FCC catalyst (E-Cat) with catalyst to feed ratio of 0.2 is used. Five different types of waste plastic feed stocks were used such as waste acrylonitrile butadiene styrene (ABS) pellets, waste high density poly ethylene (HDPE) pellets, waste linear low density poly ethylene (PE) film category carry bags and milk pouches mixture, waste poly propylene (PP) straws, and poly styrene (PS) electric & electronic waste plastic, samples are used to study the catalytic conversion at different temperatures.

The results for examples 37-41 are tabulated below in Table 9.

TABLE 9

Effect of different kinds of the waste plastic feedstock samples on catalyst loading on the annular chamber of the rotary kiln

| | Example no | | | | |
|---|---|---|---|---|---|
| | 37 | 38 | 39 | 40 | 41 |
| Waste Plastics Feed type | Toys and household items (ABS) | Pipes, bins and house hold items (HDPE) | Milk pouches, courier bags, trash fish packets, Laminated sheets (LLDPE + LDPE) | Straws (PP) | Electrical & Electronic (PS) |
| Temperature, °C. | 425 | 500 | 525 | 480 | 475 |
| Catalyst/Feed | 0.2 | 0.2 | 0.2 | 0.2 | 0.2 |
| Reactor rotation rpm | 1.2 | 1.2 | 1.2 | 1.2 | 1.2 |
| Angle of inclination degree | 1.5 | 1.5 | 1.5 | 1.5 | 1.5 |
| delP at reactor outlet | −2 | −2 | −2 | −2 | −2 |
| Gasoline (IBP - 210) | 43.4 | 33.8 | 37.3 | 43.1 | 41.2 |
| LCO (215-360) | 27.9 | 28.6 | 19.2 | 19.5 | 20.5 |
| CSO (360+) | 10.8 | 17.3 | 11.2 | 15.9 | 24.3 |
| Gas, ($C_1$-$C_4$) % | 8.5 | 13.4 | 13.8 | 15.6 | 10.2 |
| Char, % | 9.4 | 6.8 | 18.5 | 5.9 | 3.8 |
| GC/MS analysis of the gasoline (IBP - 210) | | | | | |
| Paraffin | 2.3 | 15.3 | 5.5 | 17.3 | 15.1 |
| Mono-Olefin | 5.8 | 3.8 | 55.9 | 58.2 | 10.1 |
| Di-Olefin | 0.3 | 2.3 | 3.8 | 5.1 | 0.7 |
| Aromatics | 91.5 | 76.6 | 33.7 | 19.2 | 73.7 |

From Table 9, it is evident that the process of the present disclosure effectively converts different types of plastic into high quality liquid fuel. The temperatures are optimized on the basis of highest liquid product yields obtained in the lab studies. The liquid yield was least for waste plastics type LLDPE and LDPE film mixtures while the others gave almost similar yields. Gas yield was and char yields were lowest and highest with waste LLDPE and LDPE film mixtures due to branching intensity and less cross linking of polymers which affected the product distribution. The difference in the yields is a reflection of the temperature, feed specification and the nature of the catalyst used in which these feeds are pyrolyzed.

Examples 42-46

Effect of Different Kinds of Waste Plastic Feedstock Samples without Catalyst Loading on the Annular Chamber of the Rotary Kiln are Studied in Experiments from 26 to 30

TABLE 10

Effect of different kinds of the waste plastic feedstock samples without catalyst loading

| | Example no | | | | |
|---|---|---|---|---|---|
| | 42 | 43 | 44 | 45 | 46 |
| Waste Plastics Feed type | Toys and household items (ABS) | Pipes, bins and house hold items (HDPE) | Milk pouches, courier bags, trash fish packets, Laminated sheets (LLDPE + LDPE) | Straws (PP) | Electrical & Electronic (PS) |
| Temperature, °C. | 425 | 500 | 525 | 480 | 475 |
| Catalyst/Feed | 0 | 0 | 0 | 0 | 0 |
| Reactor rotation rpm | 1.2 | 1.2 | 1.2 | 1.2 | 1.2 |
| Angle of inclination degree | 1.5 | 1.5 | 1.5 | 1.5 | 1.5 |
| delP at reactor outlet | −2 | −2 | −2 | −2 | −2 |

TABLE 10-continued

Effect of different kinds of the waste plastic feedstock samples without catalyst loading

| | Example no | | | | |
|---|---|---|---|---|---|
| | 42 | 43 | 44 | 45 | 46 |
| Gasoline (IBP - 210) | 34.2 | 24.7 | 29.9 | 30.7 | 31.1 |
| LCO (215-360) | 27.0 | 23.7 | 14.0 | 15.0 | 15.8 |
| CSO (360+) | 11.8 | 21.4 | 15.8 | 22.8 | 29.1 |
| Gas, ($C_1$-$C_4$) % | 6.5 | 11.4 | 15.8 | 11.6 | 8.2 |
| Char, % | 20.4 | 18.8 | 24.5 | 19.9 | 15.8 |

It is observed from the thermal conversion experiments 42-46 that there is a formation of significant agglomerated lumps and sticky material of unreacted feed mixed with char at the inner walls of reactor. All these operational issues were not observed in case of catalytic conversion experiments (37-41). The presence of resolved agglomeration of unconverted polymers and sticky materials inside the annular chamber of the kiln.

Technical Advancements

The present disclosure described herein above has several technical advantages including, but not limited to, the realization of a process for catalytic conversion of the waste plastic into liquid fuel, that is
    carried out at significantly lower temperatures, thereby providing energy efficient process;
    simple and economical; and
    capable to providing high liquid yield with enhanced gasoline content.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A method for catalytic conversion of waste plastic into liquid fuel, the method comprising the following steps:
    i. mixing the waste plastic feed and a catalyst in a feed hopper to obtain a mixture;
    ii. feeding the mixture to a rotary kiln rotator via a screw feeder;
    iii. thermally decomposing the waste plastic from the mixture at a temperature in the range of 350 to 650° C. and under a pressure in the range of 0.0010 psi to 0.030 psi, to obtain a gaseous stream;
    iv. purging the gaseous stream from the rotary kiln rotator by means of carrier gas;
    v. feeding the purged gaseous stream to a cyclone separator to separate solid particles from the gaseous stream;
    vi. subjecting the gaseous stream obtained from the cyclone separator to sequential cooling in a condensation unit to a temperature in the range of −5 to −15° C. to condense the liquid fuel;
    vii. collecting the condensed liquid fuel in a liquid collection tank; and
    viii. feeding the non-condensable gas from the condensation unit to a gas-liquid separator to separate a product gas comprising $C_1$ to $C_4$ hydrocarbons and the liquid fraction.

2. The method as claimed in claim 1 further comprises shredding and/or grinding the waste plastic feed before mixing with the catalyst to obtain the particulates of a size in the range of 1 to 10 cm.

3. The method as claimed in claim 1, wherein the waste plastic feed is selected from the group consisting of high density and low density polyethylene, linear low density polyethylene, polypropylene, poly styrene, PET, EPDM and combination thereof.

4. The method as claimed in claim 1, wherein the catalyst is selected from the group consisting of spent FCC catalyst, Y-zeolite and ZSM-5 zeolite.

5. The method as claimed in claim 1, wherein the weight ratio of the feed to the catalyst is in the range of 1:0.1 to 1:3.

6. The method as claimed in claim 1, wherein the carrier gas is selected from nitrogen, argon and the product gas.

7. The method as claimed in claim 1, wherein the solid particles separated in the cyclone separator comprises a residual catalyst and char particles; and
wherein the solid particles are collected in a bio-char drum.

8. The method as claimed in claim 1, wherein the step of sequential cooling of the gaseous stream involves four stage cooling by means of chilling liquid, wherein
in the first stage, the gaseous stream is cooled to 30 to 20° C. to condense liquid fuel comprising greater than $C_{20}$ hydrocarbons;
in the second stage, the gaseous stream is cooled to 15 to 10° C. to condense liquid fuel comprising $C_{13}$-$C_{20}$ hydrocarbons;
in the third stage, the gaseous stream is cooled to 5 to 0° C. to condense liquid fuel comprising $C_7$-$C_{12}$ hydrocarbons; and
in the fourth stage, the gaseous stream is cooled to −20 to −10° C. to condense liquid fuel comprising $C_5$-$C_6$ hydrocarbons.

9. The method as claimed in claim 8, wherein the chilling liquid is selected from water and ethylene glycol.

10. The method as claimed in claim 8, wherein in the first and second stage, water is used as chilling liquid.

11. The method as claimed in claim 8, wherein in the third and fourth stage, ethylene glycol is used as chilling liquid.

12. The method as claimed in claim 1, wherein the process further comprises feeding the product gas comprising $C_1$ to $C_4$ hydrocarbons to the power generation turbine system for power generation.

13. The method as claimed in claim 1, wherein the residual catalyst is regenerated in a catalyst regeneration unit.

14. A system for conversion of waste plastic into a liquid fuel, the system comprising:
a. a feed hopper adapted to collect the waste plastic feed;
b. a screw feeder adapted to feed a waste plastic feed and a catalyst to a rotary kiln reactor;
c. the rotary kiln reactor adapted to thermally decompose the waste plastic;
d. a cylindrical pipe positioned in the rotary kiln reactor and adapted to facilitate the thermal decomposition of the waste plastic in the annulus area of the kiln reactor and to increase a velocity of product vapour; wherein the cylindrical pipe is closed at both the ends;
e. helical baffles attached to the inner wall of the rotary kiln reactor from one end to other end and adapted to increase the residence time of catalyst and molten plastic;
f. a draft fan adapted to generate negative pressure in the rotary kiln reactor;
g. a cyclone separator adapted to separate the residual catalyst and char particles from the gaseous stream generated in the rotary kiln reactor to obtain a gaseous stream;
h. a bio-char drum adapted to collect solid particles separated in the cyclone separator;
i. a four stage condensation unit adapted to cool the gaseous stream;
j. a liquid collection tank unit adapted to collect condensed liquid from the condensation unit; and
k. a gas liquid separator adapted to separate non-condensable gases from the liquid fraction.

15. The system as claimed in claim 14 further comprises a catalyst regeneration unit adapted to regenerate the catalyst.

16. The system as claimed in claim 14 further comprises a power generation turbine system adapted to generate power.

17. The system as claimed in claim 14, wherein the angle of inclination of the rotary kiln reactor is in the range of 1 to 10 deg.

18. The system as claimed in claim 14, wherein the rotating speed of the rotary kiln reactor is in the range of 0.2 to 20 rpm.

19. The method as claimed in claim 7, wherein the residual catalyst is regenerated in a catalyst regeneration unit.

* * * * *